(12) United States Patent
Høgmoe

(10) Patent No.: US 8,358,025 B2
(45) Date of Patent: Jan. 22, 2013

(54) WAVE ACTUATED POWER GENERATION APPARATUS AND METHOD OF USE

(76) Inventor: Jørgen Høgmoe, Oslo (NO)

( * ) Notice: Subject to any disclaimer, the term of this patent is extended or adjusted under 35 U.S.C. 154(b) by 663 days.

(21) Appl. No.: 12/309,156

(22) PCT Filed: Jul. 6, 2007

(86) PCT No.: PCT/NO2007/000262
§ 371 (c)(1),
(2), (4) Date: Jun. 30, 2009

(87) PCT Pub. No.: WO2008/004893
PCT Pub. Date: Jan. 10, 2008

(65) Prior Publication Data
US 2010/0026000 A1   Feb. 4, 2010

(30) Foreign Application Priority Data

Jul. 7, 2006  (NO) .................................. 20063173

(51) Int. Cl.
*F03B 13/10* (2006.01)
*F03B 13/12* (2006.01)
*H02P 9/04* (2006.01)

(52) U.S. Cl. .......................................... 290/53; 290/42

(58) Field of Classification Search ................ 290/42, 290/43, 53, 54; 60/498, 497, 495, 496, 501, 60/502, 505, 698; 417/330, 332; 415/7, 415/906; 416/85
See application file for complete search history.

(56) References Cited

U.S. PATENT DOCUMENTS

| 1,078,323 | A | | 11/1913 | Trull | |
|---|---|---|---|---|---|
| 1,667,152 | A | * | 4/1928 | Hegge | 185/30 |
| 3,928,967 | A | * | 12/1975 | Salter | 60/398 |
| 4,077,213 | A | * | 3/1978 | Hagen | 60/500 |
| 4,118,932 | A | * | 10/1978 | Sivill | 60/500 |
| 4,210,821 | A | * | 7/1980 | Cockerell | 290/53 |
| 4,389,843 | A | * | 6/1983 | Lamberti | 60/507 |
| 4,686,377 | A | | 8/1987 | Gargos | |
| 5,132,550 | A | * | 7/1992 | McCabe | 290/53 |
| 5,359,229 | A | * | 10/1994 | Youngblood | 290/53 |
| 7,102,249 | B2 | * | 9/2006 | Wobben | 290/54 |
| 2006/0208494 | A1 | * | 9/2006 | Cook | 290/53 |
| 2007/0200353 | A1 | * | 8/2007 | Ottersen | 290/53 |
| 2009/0066085 | A1 | * | 3/2009 | Gray | 290/42 |

FOREIGN PATENT DOCUMENTS

| DE | 4310997 A1 | 6/1994 |
|---|---|---|
| EP | 0035346 A2 | 9/1981 |
| GB | 2091815 A | 8/1982 |
| JP | 56092363 A * | 7/1981 |

OTHER PUBLICATIONS

Int'l Search Report, Nov. 26, 2007.

\* cited by examiner

*Primary Examiner* — Julio C. Gonzalez

(74) *Attorney, Agent, or Firm* — Abelman, Frayne & Schwab

(57) ABSTRACT

A wave-powered electrical generation apparatus including an array of buoyant bodies and at least one energy-generator connected to one or more moveable links and forming a part of each link, each link being configured as a hinge with a first hinge part constituted by or connected to a stator, a second hinge part constituted by or connected to a rotor, and a hinge link shaft pivotly connecting the first and second hinge parts. At least one connection element is provided between adjacent links, wherein each link includes or is coupled to at least one of the array of buoyant bodies.

20 Claims, 6 Drawing Sheets

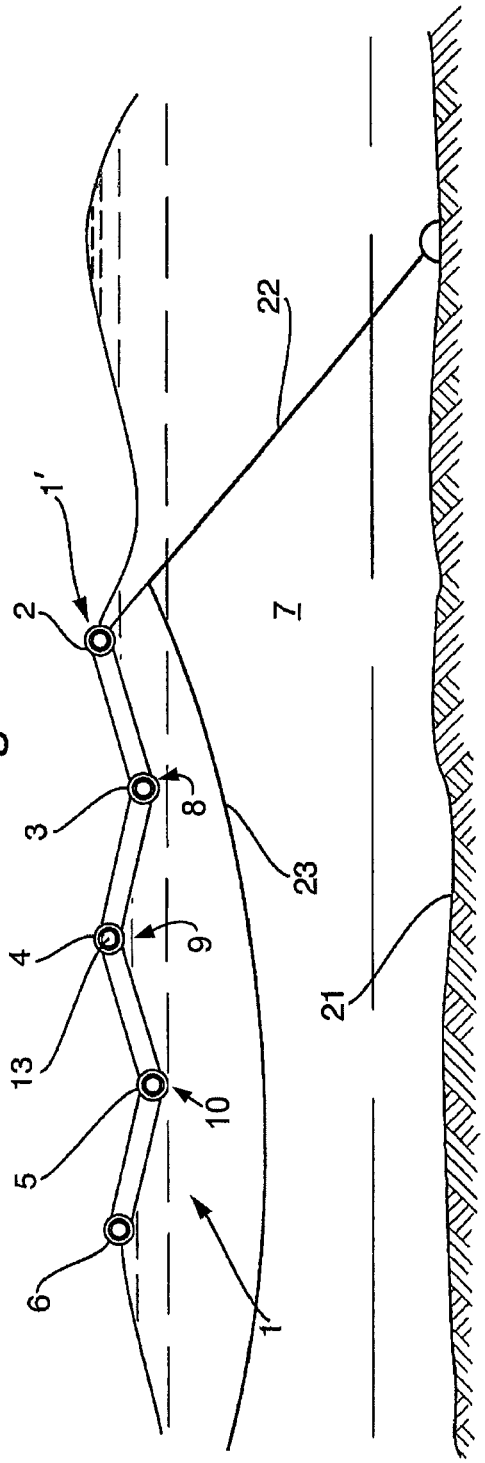
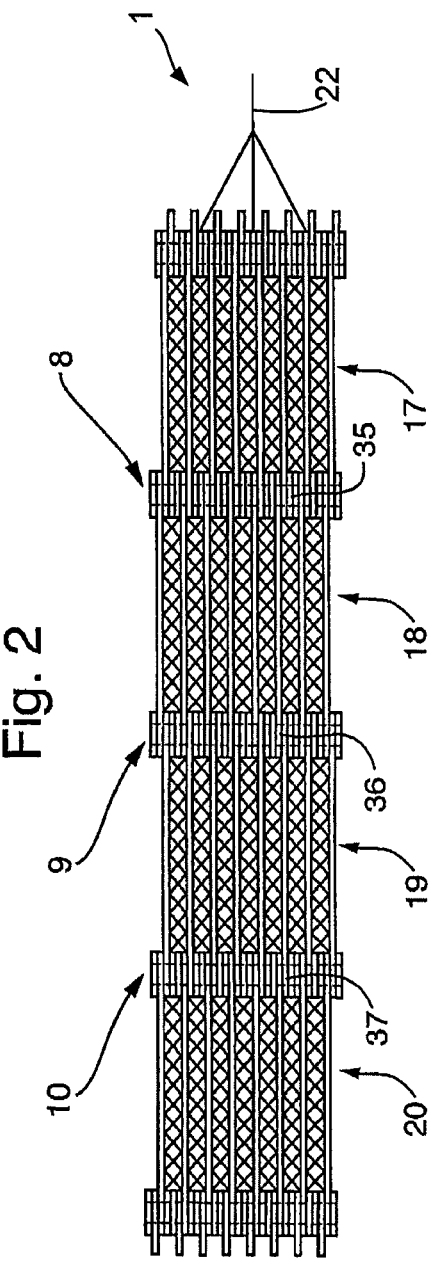

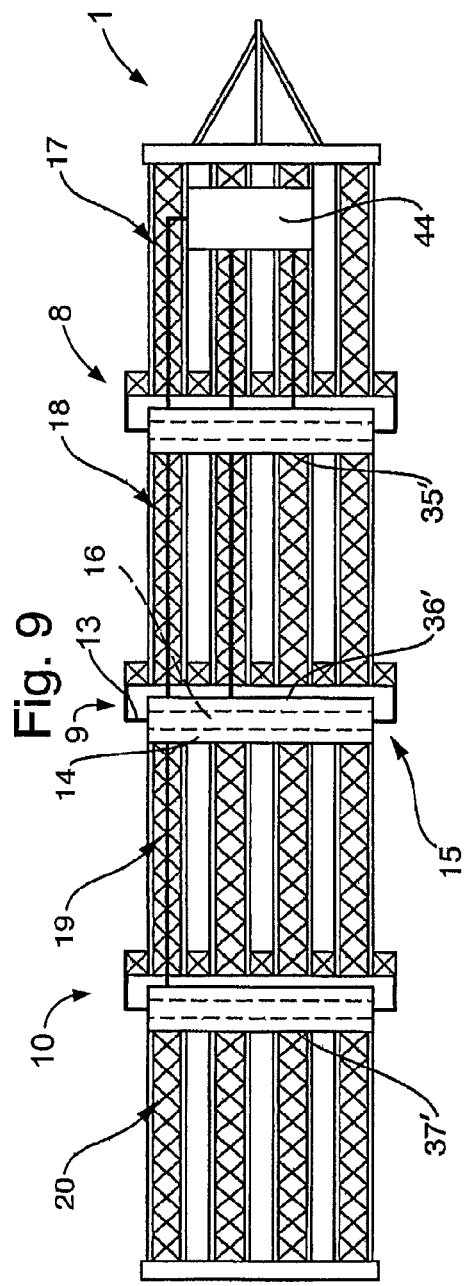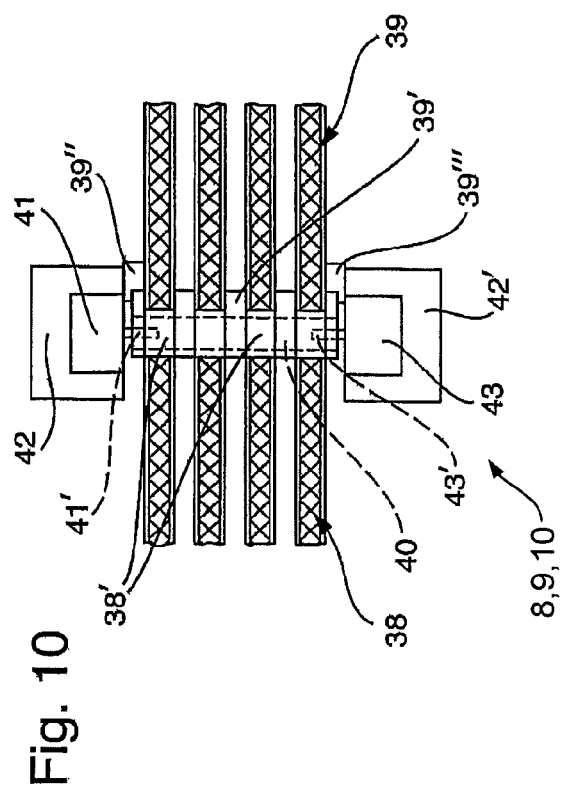

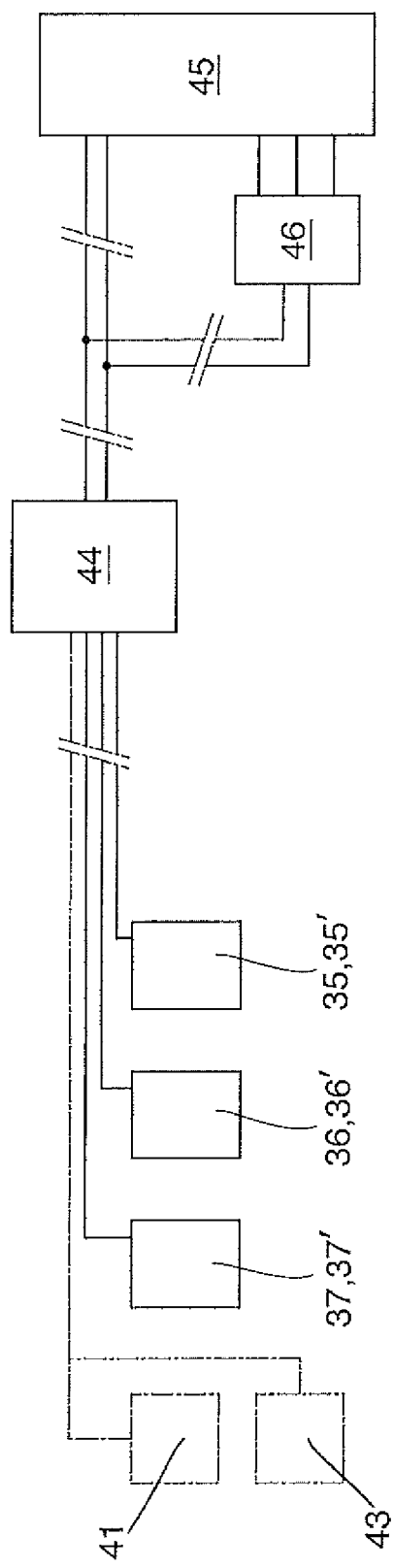

WAVE ACTUATED POWER GENERATION APPARATUS AND METHOD OF USE

The present invention relates to a wave power apparatus wherein an array of mutually articulated buoyancy bodies are arrangeable on or partly submersible in a mass of water in order therein to be subjected to wave motion, at least one energy-generating means being arranged in association with the movable links in the array and forming part of the individual link, the link being shaped as a hinge with a first hinge part constituted by or connected to a stator of an electric generator, with a second hinge part constituted by or connected to a rotor in the electric generator, and with a link shaft.

To illustrate the prior art, reference may be made, inter alia, to the following documents:

GB 2091815 which relates to buoyancy bodies that are hinge-connected by means of a generator housing and the generator rotor shaft;

DE 4310997 which relates to a solution in which each link is configured as a generator, and where between the links there extend connection elements, each of which is configured as a buoyancy body;

U.S. Pat. No. 4,210,821 which describes an array of floats where the mutual motion between these floats is converted into energy;

DE 4338103 which relates to a buoy where wave motion moves a magnet up and down along a coil;

GB 2402557 which relates to a float which via a lever and a fulcrum and also a resilient means causes a magnet to move in and out of the gap of a stator which has electric coils; and GB 2338839 which describes two solutions, one of which involves a hydrofoil with a movable tail and a linear generator in the link.

By way of further illustration of the general prior art, mention may be made of the documents:

U.S. Pat. No. 1,078,323, U.S. Pat. No. 4,686,377 and EP 0035346, which relate to a wave power plant based on fluid compressors or fluid pumps coacting with the links in an array of elements, which jointly, together with buoyancy bodies constitute the apparatus.

Wave power has the merit of being renewable energy with huge potentials in the wave energy, depending on equipment location and technology. The advantage is that it is possible to obtain electrical energy by wave power, thereby avoiding $CO_2$ emissions from the combustion of fossil fuels. However, wave power has only been made use of to a limited extent. This is due to factors such as an uneven production of energy, costly and exposed installations, often long transport routes for energy from the installation to the consumer on shore, and difficulties in connection with offshore installation and assembly operations.

To obtain optimum exploitation of the wave energy, it is important that the area which moves up and down is as large as possible. The traditional solution has therefore been to locate the buoyancy bodies between the links, which can result in the connection elements becoming unhandy, easily susceptible to damage and expensive to manufacture. The reason has most often been that the equipment which is to convert power is heavy and requires buoyancy, and that the configuration of the buoyancy bodies therefore must be adapted to the power conversion equipment which is associated with the links and which in some cases extends a distance along the buoyancy bodies. It is however also important from point of view of handling to reduce the total weight as much as possible, simultaneously enabling modular construction which reduces production costs, simplifies assembly, makes handling and launching into the sea easier, even under adverse weather conditions, and enabling simpler storage of the modules constituting the overall apparatus. This has however, with the previous structures, not proved possible, even though there is much known technique in the art.

Many of the known solutions make use of parts that are easily subjected to wear and, not least, are complicated to replace. Many of the component parts of the known apparatus do not actually contribute to the conversion of wave energy, because the traditional float solutions are generally anchored to the seabed and have a power generator which generates power when parts of the generator are mutually moved with the up and down motion of the float. It is the forces and thus also the energy transferred down to the seabed that should be avoided as far as possible.

Furthermore, it is essential to ensure that a wave power plant is capable of withstanding extreme weather conditions, with strong winds and large wave heights. Even if a wave power plant could be located close to a coastal area, it must also be capable of functioning away from a visible coastal area. It is therefore important that the wave power plant also at sea is easily deployed and retrieved, and has a light, though at the same time a robust structure.

The object of the present invention is therefore to provide an apparatus which remedies some of the obvious defects or drawbacks of the known solutions, and consequently the aim is to make possible an apparatus in which electric power can be produced directly, where deployment and retrieval of the apparatus is simple and fast, where the apparatus can be configured modularly, and where the apparatus, when placed on board a vessel during transport, requires relatively little space.

The apparatus mentioned above is characterised, according to the invention, in that between the links and between each end and the closest link there extend connection elements which have no buoyancy or have limited buoyancy; that each end of the array is assigned at least one buoyancy body which either is attached to the end or has a depending connection to the end; and that buoyancy bodies are assigned to the links and are each composed of at least one of the following means:

said link shaft;

part of the link shaft;

buoyancy body or bodies attached to or at each link;

buoyancy body attached at or to a respective end region of each link; and buoyancy body with depending connection to each link.

Additional embodiments of the apparatus will be apparent from the attached subsidiary claims, and from the description below with reference to the attached drawings.

FIG. 1 shows a first mode of operation of the apparatus according to the invention.

FIG. 2 is a top view of the apparatus shown in FIG. 1.

FIG. 9 shows a modification of the solution shown in FIG. 2 and in FIGS. 6-8.

FIG. 10 shows a further modification of the apparatus shown in FIGS. 2, 6-8 and 9.

FIG. 11 shows in the form of a block diagram the connection between generators included in the apparatus and an energy consumer.

Figure 3:
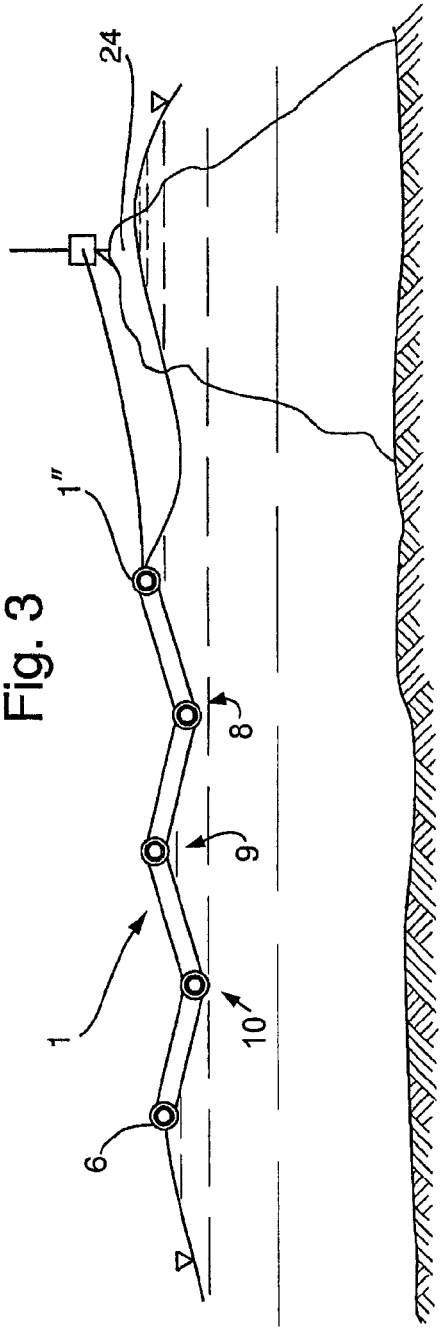
FIG. 3 shows a second mode of operation of the apparatus according to the invention.

FIGS. 1-5 show a wave power apparatus 1 wherein an array of mutually interconnected floats 2, 3, 4, 5, 6 are arrangeable on or partly submersible in a body of water 7 in order therein to be subjected to wave motion. Some of the floats are associated with or form a part of movable links 8, 9, 10 in the array. As shown in more detail in FIGS. 7-9, arranged in each of these movable links 8-10 is an energy generating means in the chosen example. Illustratively, the part 11 (e.g., $11_1$-$11_n$, wherein n=16) can form a stator whilst the part 12 (e.g., $12_1$-$12_n$, wherein n=16) can form a rotor.

Figure 6:
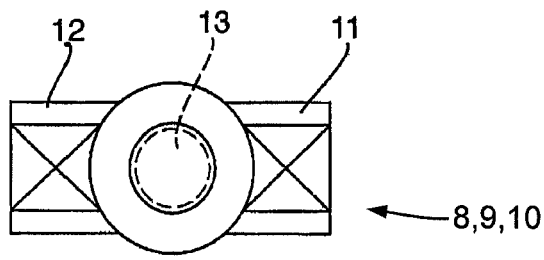
FIG. 6 is a side view of a section of the apparatus according to the invention with link shaft.
Figure 7:
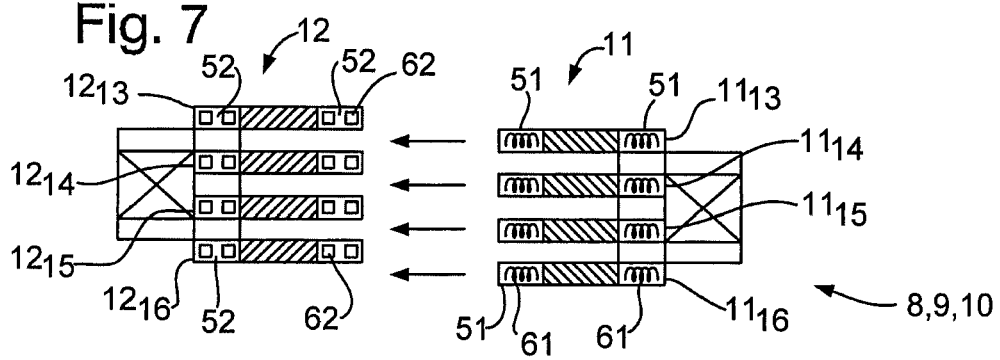
FIG. 7 shows the section VII in FIG. 8 before the assembly of the rotor part and stator part of a generator.
Figure 8:
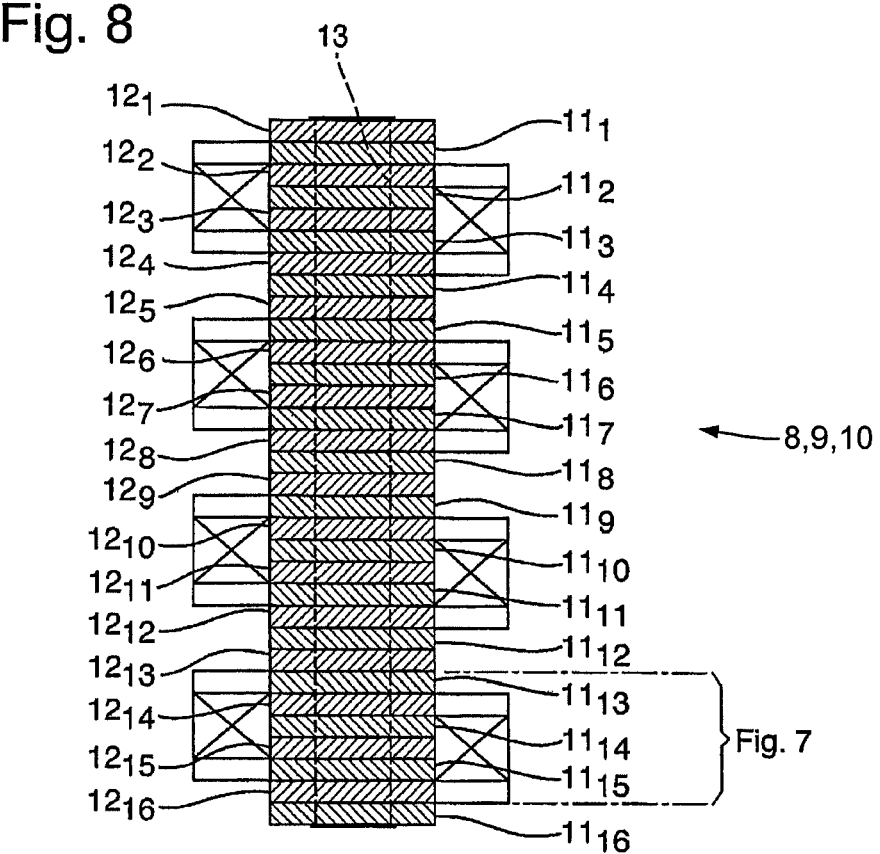
FIG. 8 is a top view of a section of the apparatus as shown in FIG. 2.

The outlined generator according to FIGS. 6-8 consists, as mentioned, of a stator 11 and a rotor 12. Basically, both the stator 11 and the rotor 12 should be electrically insulated from the surroundings, so that the generator is durable and water-resistant. Referring to the partial cross-sectional view of the stator 11 and rotor 12 shown in FIG. 7, it is conceived that the stator 11 consists of a plurality of parallel, annular bodies $11_1$ to $11_n$ (where "n" is an integer greater than one), each body being divided into a plurality of mutually electrically separated segments 51 containing induction coils 61. It is further conceived that the rotor 12 similarly consists of a plurality of mutually parallel annular bodies $12_1$ to $12_n$, each body being equipped with segments 52 of permanent magnet material or conventional magnets 62, so that when the rotor 12 moves relative to the stator 11, constantly changing fields will be set up in the induction coils 61 of the stator 11. The stator of each generator generates an alternating current, but the current is from the respective generators will not necessarily be in phase. The stator annular bodies $11_n$, and the rotor annular bodies $12_n$ are interleaved together and a link shaft 13 further extends centrally through the interleaved annular bodies $11_n$ and $12_n$ to thereby form each cylindrical moveable link 8, 9, 10, as illustratively shown in FIGS. 7 and 8.

The parts 11 and 12 have a through hole through which a link shaft 13 can extend. The link shaft is expediently fastened either to the stator 11 or to the rotor 12, so as to permit the rotor 12 to move relative to the link shaft 13 and the stator 11, or to permit the stator 11 to move relative to the rotor 12 and the link shaft 13. However, it is also conceivable that the link shaft is simply limited at its ends, and that when the link moves up and down, the stator and the rotor are both movable about the link shaft. The link shaft is in this case expediently configured as a buoyancy body, and this body may be hollow, may be tubular with internal ribs (for example, made by extrusion), or may be tubular and filled with a stiffening material, for example, a foam plastic. In a number of cases, there may be an extra need for additional buoyancy bodies associated with each link and the ends of the array.

The energy generating means (e.g., formed by one or more stator and rotor 11, 12 assemblies) constitutes a part of the individual link. The links 8-10 are shaped as a hinge, wherein a first hinge part is constituted by the stator of the electric generator and the second hinge part is constituted by the rotor 12 in the hinge part. In the illustrated example, the link shaft 13 of the hinge will extend through the centre of the stator 11 and the rotor 12, respectively.

In one alternative, as shown in FIG. 9, the first hinge part of each moveable link 8, 9, 10 is connected to a stator 14 of an electric generator 15 and the second hinge part is constituted by or connected to a rotor 16 in the hinge part. In this solution, it is conceivable that the hinge has a link shaft 13 which is constituted at least in part by the rotor 16 which serves as a generator drive shaft. The individual generators thus formed are indicated by means of the respective reference numerals 35'; 36'; 37'. A person of ordinary skill in the art will appreciate that the individual links 8, 9 and 10 can each be configured as a buoyant body in a similar manner as illustratively described above with respect to FIGS. 6-8, or can be tethered to floatation devices such as floats 26-30 illustratively shown and described below with respect to FIG. 5, or can include buoyant bodies that are directly attached to the links 8, 9, 10, as illustratively shown and described below with respect to FIG. 10.

In the other alternative as outlined in FIG. 10, connection elements 38; 39 are mutually movably hinged together via respective hinge parts 38'; 39' and a common shaft 40. In the illustrated embodiment, the shaft 40 is rigidly attached to the hinge parts 38', whilst the hinge parts 39' are movable relative to the hinge parts 38' and the shaft 40. The shaft 40 may be wholly or partly hollow, so that it forms a buoyancy body. If desired, the shaft 40 may have internal ribs or be filled with a light stiffening filling material, for example, of foam plastic. The generator housings of electric generators 41 and 43 are secured by mountings 39"; 39"' to the connection element 39, whilst the respective generator drive shafts 41'; 43' are axially aligned with and rigidly attached to the shaft 40. Buoyancy bodies 42; 42' are provided for the respective generators 41; 43. When wave motion causes the respective two main connection elements 38, 39 of the moveable links 8-10 to change their mutual angle, the pivot shafts 41'; 43' will turn relative to a respective generator housing 41, 43, whereby power is generated from the generator.

As the power generated will be an alternating current, i.e. a polarity alternating direct current, as a function of the wave frequency, it will therefore be necessary that the current from the individual generators 35; 36; 37 or 35'; 36'; 37' or 42; 43 (more generators if there are more links in the array) is passed to a rectifier part 44 as shown in FIG. 11 and rectified therein. As further shown in FIG. 9, the rectifier part 44 is expediently placed at the end of the apparatus, i.e., before the rectified energy is then supplied to a consumer 45 (see FIG. 11) either directly as direct current, or via an inverter 46 as a supply of alternating current to the consumer.

As shown in FIGS. 2 and 9, the individual links in the array are connected by connection elements 17-20. In normal circumstances, these connection elements have little or no natural buoyancy, it being desirable that the buoyancy should be at the hinge links themselves, and also at the end regions of the array, where there is no generator. As mentioned, the link shaft itself may form an effective buoyancy body, in that it is hollow or filled with a buoyancy material which fills the cavity of the link shaft.

In the solution shown in FIGS. 1 and 2, the object is intended that the array at one end 1' thereof is designed to be capable of being moored to an ocean floor/seabed 21 via a line or chain 22. Power cable 23 from the generators can either follow the line 22 to the seabed and thence be passed onwards to the user site, or be laid partly floating in the sea to a user installation, for example, on shore.

FIG. 3 shows that the array at one end 1" thereof is designed to be able to be connected to a geological formation 24. One such formation 24 may consist of a formation which at all times projects above the surface of the body of water independent of tidal ranges, or of a formation which, independent of tidal ranges, is under the surface of the body of water. The power cable 23' may, in this case, be passed directly to the formation 24.

Figure 4:
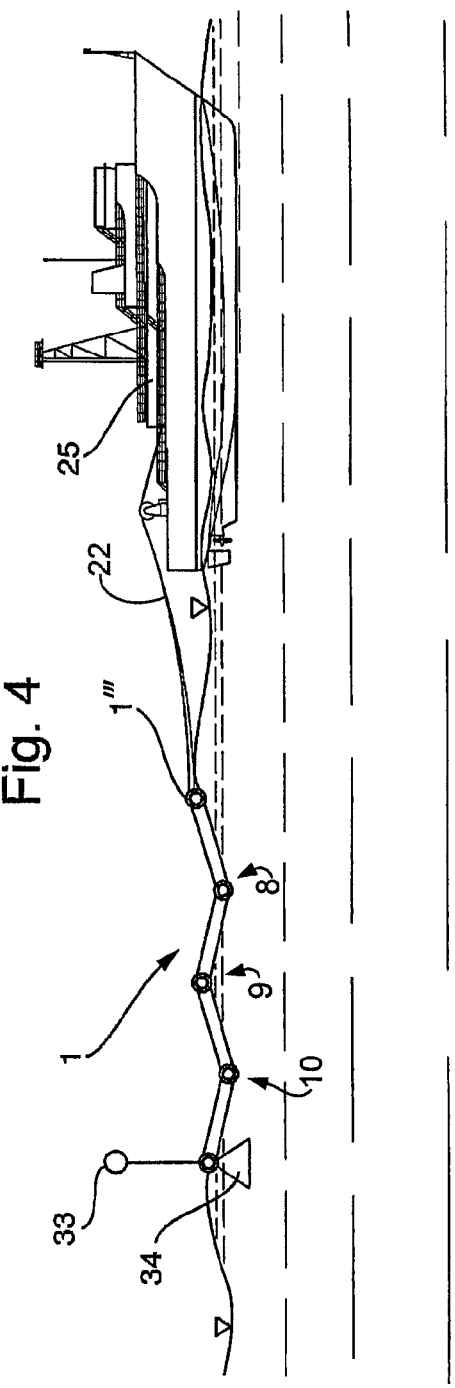
FIG. 4 shows a third embodiment of the apparatus according to the invention.

In connection with the use illustrated in FIG. 4, the object is to show that the apparatus will be able to serve as an emergency power source for a floating craft/vessel 25. This may perhaps be relevant if the craft has engine failure and the power generator on board thus no longer generates power. In this case, the array 1 of the apparatus can at one end 1''' be connected to the craft/vessel 25. In an expedient embodiment, the apparatus 1 is easily dismantable at all links by pulling out the link shaft, or in that the apparatus is readily collapsible at the links. Thus, the apparatus will be easily stowable on board if its use is not required.

With the solutions shown in FIGS. 1-4, it is intended that the link shafts themselves will be able to form buoyancy bodies, but it is of course possible to add additional buoyancy bodies at the links and at the end of the array.

Figure 5:
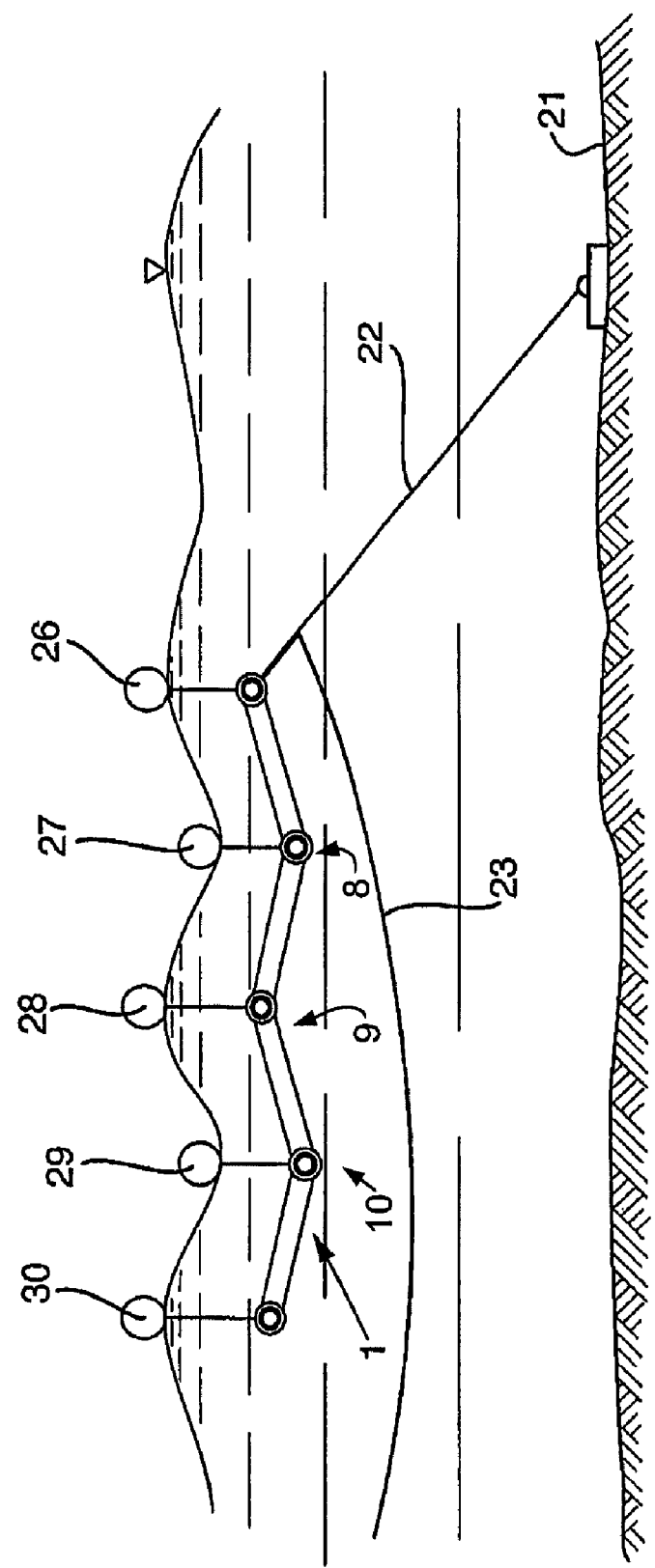
FIG. 5 shows a fourth embodiment of the apparatus according to the invention.

The solution shown in FIG. 5 resembles that shown in FIG. 1, but it will be seen that extra floats are placed at the links and the ends of the array. This is a solution which also may be highly relevant for the exemplary embodiment which can be seen in FIG. 10.

In the solution shown in FIG. 5, it is envisaged that the apparatus has a natural insufficient buoyancy and may possibly be submerged slightly below the water surface, and in this case each of the links in the array and the ends of the array can be suspended from at least two floats 26, 27, 28, 29, 30. In certain circumstances, especially if there is to be no risk of boat traffic colliding with the apparatus, this solution may be appropriate.

In order optionally to standardise the elements that are to be included in an array of elements, the connection elements, such as connection elements 17-20, may, for example, be of standardised modules, as for instance a) two combinable types, i.e., with a1) a stator at both ends and a2) a rotor at both ends; b) only with a stator at one end and a rotor at the other end; and/or c) with c1) a rotor at only one end or c2) a stator at only one end. A module of the type c) is particularly suitable for the end elements in an array, so that the outer ends of the array do not contain a costly inactive rotor part or stator part.

As mentioned above, it is preferred that the buoyancy bodies are arranged in, are arranged at or are suspended from said links in the array, so that between the links and in addition between the ends of the array and the closest link there extend connection elements having no buoyancy or limited buoyancy.

With reference to FIGS. 1-9, it will be understood that each of said floats or buoyancy bodies may be constituted by at least one of the following means: said link shaft 13 configured as a buoyancy body; buoyancy body 27-29 attached to the links 3-5; buoyancy body 26, 30 attached to the ends of said connection element; buoyancy body attached to each end region of the link and to the ends of the apparatus; and buoyancy body with depending connection to each link and the ends of the apparatus, as shown in FIG. 5.

FIG. 10 shows that generators are fastened to each end of the link shaft by their drive shaft, and that the buoyancy bodies there are fastened to the generator housing or surround it.

Irrespective of the area that the apparatus according to the invention will cover, it will be important that it is equipped with suitable markings 33, for example, selected from the group: radar reflector, light emitter, marker stakes, radio transmitter and marker balloon anchored at least one end of the array.

In some cases, it may also be expedient to equip the apparatus with at least one keel 34, so that it becomes directionally stable relative to the mounting site.

The invention claimed is:

1. A wave powered electrical generation apparatus comprising:
    an array of buoyant bodies;
    at least one energy-generating means operably connected to each of a plurality of moveable links and forming part of the plurality of moveable links, each energy-generating means including at least one housing and each moveable link being configured as a hinge with a first hinge part constituted by or connected to a stator, a second hinge part constituted by or connected to a rotor, and a hinge link shaft pivotly connecting the first and second hinge parts;
    at least one drive shaft attached to the hinge link shaft and extending into a corresponding at least one housing to form the rotor, each housing fixedly attached to the second hinge part and including the stator; and
    at least one connection element provided between adjacent moveable links, wherein each moveable link includes or is coupled to at least one of the array of buoyant bodies.

2. An apparatus as disclosed in claim 1, characterized in that each connection element is equipped with or connected to at least one generator part selected from: stator at both ends; rotor at both ends; stator at one end and rotor at the other end; and rotor or stator at only one end.

3. An apparatus disclosed in claim 1 characterized in that the hinge link shaft extends through the center of the stator and rotor, respectively, or constitutes the generator drive shaft, or connects the hinge parts in such manner that at least one end of the hinge link shaft is axially aligned with, and is connected to a generator drive shaft.

4. The An apparatus as disclosed in claim 1, wherein the at least one connection element has a buoyancy less than each one of the array of buoyant bodies.

5. A wave-powered electrical generation apparatus comprising:
    an array of buoyant bodies;
    at least one energy-generator connected to a plurality of moveable links and forming a part of each moveable link, each moveable link being configured as a hinge with a first hinge part constituted by or connected to a stator, a second hinge part constituted by or connected to a rotor, and a hinge link shaft pivotly connecting the first and second hinge parts; and
    at least one connection element provided between adjacent moveable links, wherein each moveable link includes or is coupled to at least one of the array of buoyant bodies.

6. An apparatus as disclosed in claim 5, characterized in that the stator and the rotor in each link are both movable relative to the link shaft.

7. An apparatus as disclosed in claim 5, characterized in that the stator or the rotor is fixedly attached to the link shaft.

8. An apparatus as disclosed in claim 5, characterized in that the hinge link shaft is fixedly attached to one of the first or second hinge parts.

9. The wave-powered electrical generation apparatus of claim 5, wherein the hinge link shaft connects the hinge parts such that at least one end of the hinge link shaft is axially aligned with and is connected to a generator drive shaft.

10. The wave-powered electrical generation apparatus of claim 5, wherein the hinge link shaft constitutes a generator drive shaft.

11. The wave-powered electrical generation apparatus of claim 5, wherein the hinge link shaft extends through the center of the stator and rotor, respectively.

12. The wave-powered electrical generation apparatus of claim 5, wherein the stator comprises a first plurality of parallel annular bodies, each body being divided into a plurality of mutually electrically separated segments containing induction coils.

13. The wave-powered electrical generation apparatus of claim 12, wherein the rotor comprises a second plurality of parallel annular bodies, each body including segments of magnetic material or magnets.

14. The wave-powered electrical generation apparatus of claim 13, wherein the first and second plurality of parallel annular bodies are interleaved adjacently to each other.

15. The wave-powered electrical generation apparatus of claim 14, wherein the hinge link shaft extends through the interleaved first and second plurality of parallel annular bodies.

16. The wave-powered electrical generation apparatus of claim 5, wherein the hinge link shaft is constituted by a drive shaft pivotly connecting the first and second hinge parts.

17. The wave-powered electrical generation apparatus of claim 5, wherein each of the array of buoyant bodies is hollow and/or tubular.

18. The wave-powered electrical generation apparatus of claim 5, wherein each of the array of buoyant bodies has a buoyancy that is greater than the at least one connection element.

19. A wave-powered electrical generation apparatus comprising:
   an array of buoyant bodies;
   a plurality of energy-generators each having one or more generator housings and connected to each of a plurality of moveable links and forming a part of each moveable link, each moveable link being configured as a hinge with a first hinge part constituted by or connected to a stator, a second hinge part constituted by or connected to a rotor, and a hinge link shaft pivotly connecting the first and second hinge parts;
   at least one drive shaft coupled to and axially aligned with at least one end of the hinge link shaft and extending into a corresponding one of the generator housings, each generator housing being fixedly attached to the second hinge part; and
   at least one connection element provided between adjacent links, wherein each moveable Link includes or is coupled to at least one of the array of buoyant bodies and the at least one connection element has a buoyancy that is less than each one of the array of buoyant bodies.

20. The wave-powered electrical generation apparatus of claim 19, wherein the at least one drive shaft includes a pair of drive shafts each of which extending from an opposing end of the hinge link shaft.

* * * * *